Figure 1:
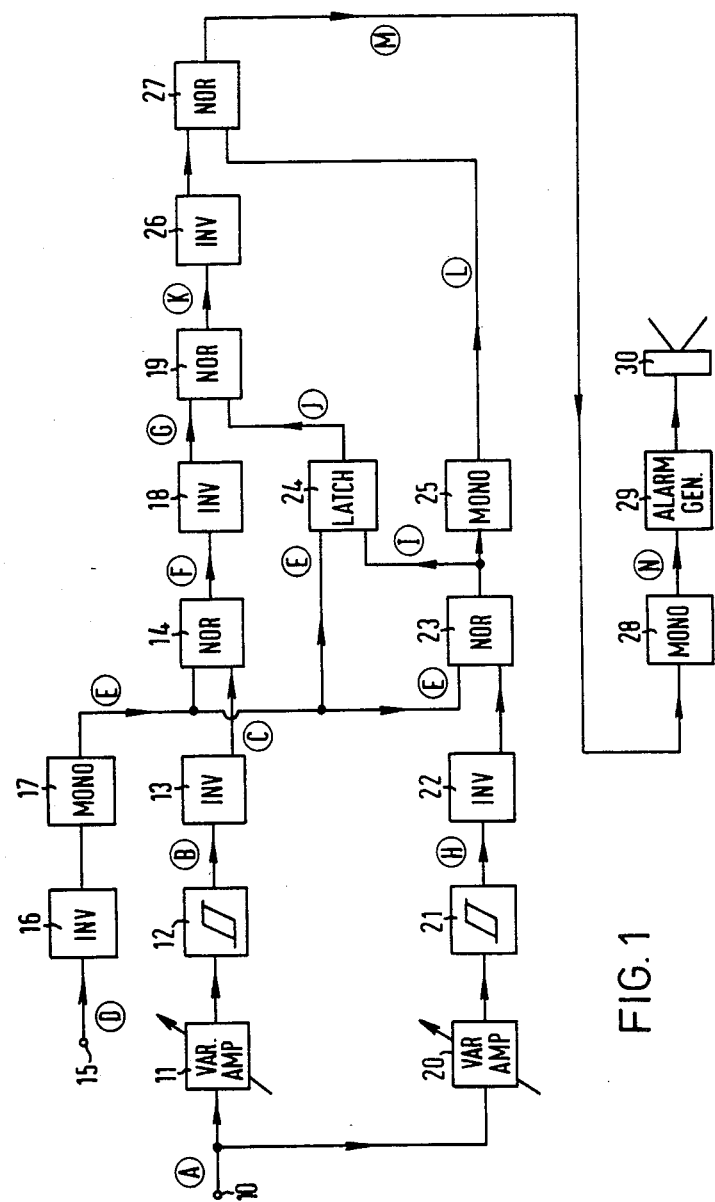

United States Patent [19]
Burns

[11] Patent Number: 4,648,081
[45] Date of Patent: Mar. 3, 1987

[54] CIRCUIT FOR AUTOMATIC SEABED DISCRIMINATION

[76] Inventor: David Burns, 46 Donscourt, Wilton, Cork, County Cork, Ireland

[21] Appl. No.: 572,055

[22] Filed: Jan. 19, 1984

[51] Int. Cl.[4] .......................... G01S 15/02; G01S 7/66
[52] U.S. Cl. ........................................ 367/87; 73/573; 73/596; 367/112
[58] Field of Search .................... 367/24, 87, 112; 73/573, 596, 616

[56] References Cited

U.S. PATENT DOCUMENTS

| | | | |
|---|---|---|---|
| 3,478,308 | 11/1969 | Stanley et al. ........................ | 73/573 |
| 3,489,996 | 1/1970 | Moon et al. ........................... | 367/24 |
| 3,629,800 | 12/1971 | Schneider ............................. | 367/24 |
| 4,353,121 | 10/1982 | Ray et al. .............................. | 367/24 |
| 4,410,966 | 10/1983 | Meyer et al. ......................... | 367/87 |

Primary Examiner—Richard A. Farley
Attorney, Agent, or Firm—Birch, Stewart, Kolasch and Birch

[57] ABSTRACT

A circuit automatically determines the nature of the seabed over which a vessel is passing, indicating via an audible or other warning signal when a fishing vessel is above a type of seabed which might damage the fishing net. The circuit is responsive to an echosounder signal and raises an alarm when a amplitude of the second bottom echo component in the echosounder signal exceeds a selected threshold level. Preferably the analog echosounder signal is subject to threshold discrimination to provide a pulse-form signal which is then processed by a digital logic circuit to isolate the second bottom echo component.

13 Claims, 2 Drawing Figures

CIRCUIT FOR AUTOMATIC SEABED DISCRIMINATION

This invention relates to a circuit for automatic discrimination of the nature of a seabed over which a vessel is passing, and in particular for indicating via an audible or other warning signal when a fishing vessel is above a type of seabed which might damage the fishing net. That is, it will differentiate between what is colloquially known to the fisherman as "hard" and "soft" fishing ground.

This information may be of vital importance to the skipper of the vessel as one touch of a net on a rocky seabed can immediately destroy or at best severely damage a net valued at anything from $2,000 to $100,000.

At present the best method is the echosounder. This system, by careful observation of the sidelobe echoes, is quite satisfactory but necessitates close and constant scrutiny of the instrument's recording paper. If the fisherman is busy or loses concentration for vital seconds this may be enough time for severe damage to be done.

Thus it is an object of the present invention to provide a circuit for use in association with a sonic or ultrasonic transceiver, such as a conventional echosounder, for automatic discrimination of the nature of the seabed over which a vessel is passing.

According to the invention such a circuit comprises means responsive to the reflected transceiver signal to extract and utilise the second bottom echo component in the transceiver signal and in particular means responsive to the reflected transceiver signal to raise an alarm when the amplitude of the second bottom echo component in the signal exceeds a selected threshold level.

The advantage of the invention is that the circuit will give a warning, preferably an audible warning, immediately as the vessel approaches hazardous fishing grounds. If the skipper receives the warning early enough, then he has a very good chance of taking avoiding action to avoid the hazard and saving his net. A second advantage is that with experience the skipper will be able to use the circuit as a reference to find out what kind of ground the vessel is passing over even when he is in strange waters.

More particularly, the invention provides a circuit for use in association with an echosounder for the automatic discrimination of the nature of the seabed over which a vessel is passing, the circuit comprising an input for the echosounder signal, the latter comprising a transmission component, a first bottom echo component, and a second bottom echo component, the echosounder signal also possibly comprising one or more fish echo components between the transmission and first bottom echo components, an adjustable threshold circuit connected to the input and arranged to provide an output when the input echosounder signal exceeds a selected threshold level, signal processing means to remove from the output signal of the threshold circuit those components thereof derived from the transmission component, the first bottom echo component and any fish echo components in the echosounder signal, leaving only that component, if any, of the threshold circuit output signal which is derived from the second bottom echo component in the echosounder signal, and means for raising an alarm in response to the presence of a second bottom echo component in the processed output signal of the threshold circuit.

The invention is based on the fact that the "harder" the seabed bottom the greater is the amplitude of the second echo component for a given depth of water. The threshold level may therefore be adjusted to correspond to the expected amplitude of the second echo component corresponding to the minimum "hardness" of the seabed which it is desired to detect in a given depth of water, false triggering of the alarm being prevented by the suppression of those components of the threshold circuit output signal corresponding to the substantially larger transmission and first echo components in the echosounder signal, together with any fish echo components.

Due to the TVG (time varied gain) waveform generated in all standard echosounders the amplitude of the second echo component is substantially less sensitive to changes in depth than to changes in the nature of the seabed, so that the selected threshold level does not need frequent readjustment in accordance with changes in the position of the vessel provided the vessel is operating in waters of the same order of depth.

Although the amplitude of the second echo component is more sensitive to the nature of the seabed than the first echo component, particularly in bad weather conditions, as an optional feature for deep water when the amplitude of the second echo component may be very low and possibly obscured by noise, it is possible to provide means for selecting the amplitude of the first echo component for triggering the alarm.

Preferably, the output from the threshold circuit is a binary pulse-form signal, with the signal processing means comprising digital logic circuitry.

Figure 2:
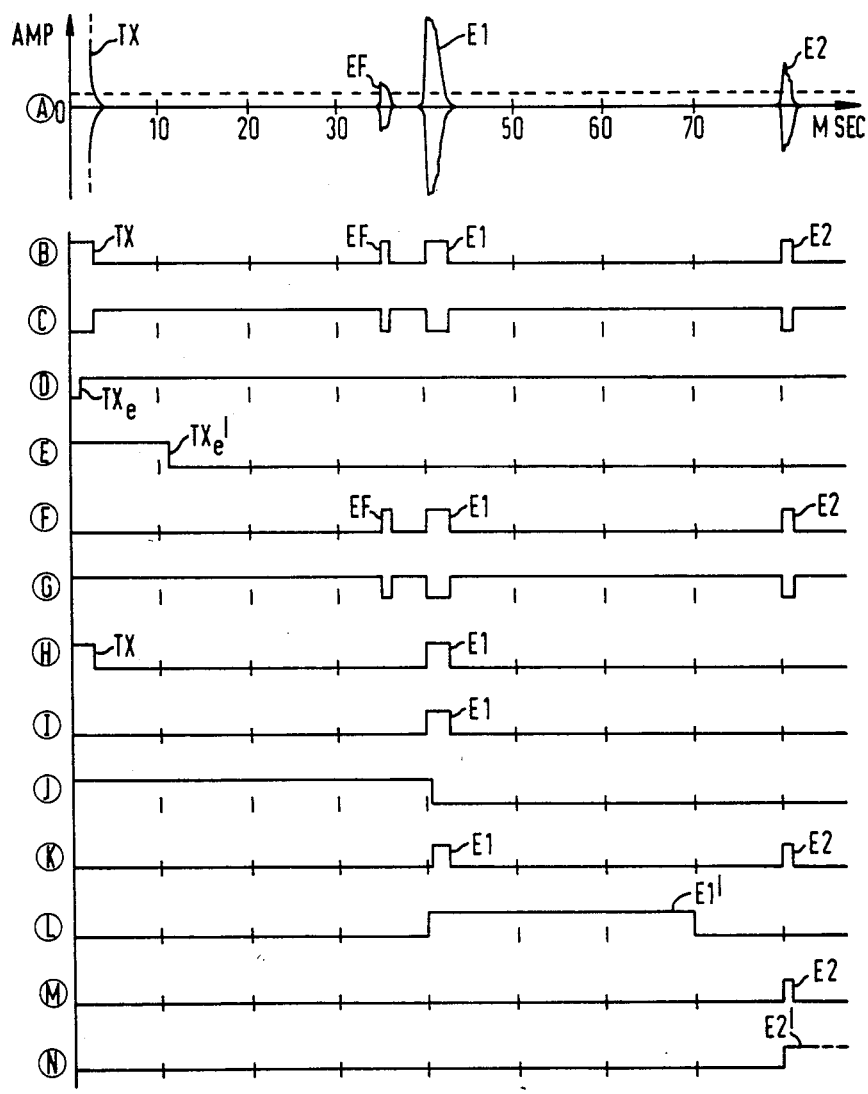

An embodiment of the invention will now be described, by way of example, with reference to the accompanying drawings, wherein:

FIG. 1 is a block schematic diagram of a circuit according to the invention, and FIG. 2 is a series of waveforms illustrating the operation of the circuit of FIG. 1, the letter adjacent each individual waveform identifying the similarly lettered point in FIG. 1 where that waveform appears.

Referring to the drawings, the signal from the echosounder is supplied to the circuit of FIG. 1 at an input terminal 10. A typical input signal as it might appear on an oscilloscope is shown at A in FIG. 2, and is a composite analog waveform comprising a large transmission component TX, a first bottom echo component E1 and a second bottom echo component E2, of successively decreasing amplitude. Also shown is a fish echo EF located between the transmission component TX and the first echo component E1. In practice the echosounder signal would also include noise and plankton echo etc., but these are not shown.

The positions of the various signal components on the time scale shown are typical for a depth of about 16 fathoms, the first echo component E1 occurring about 40 msecs after the transmission component TX, and the second echo component E2 occurring about 40 msecs after E1 as would be expected. The fish echo component EF occurs about 5 msecs before the first bottom echo component E1, corresponding to a position about two fathoms above the seabed. The echosounder signal A as applied to the circuit input 10 has already been partially amplified and processed by the echosounder itself, and typical values for amplitude are 4 volts peakto-peak (pp) for E1, 2 volts pp for E2 and 1 volt pp for EF, corresponding to a single large fish.

The analog signal A at the input 10 is applied first to an operational amplifier circuit 11 with a variable gain controlled by a multi-turn potentiometer (not shown), and then the amplified signal is passed to a Schmitt trigger 12. The variable gain amplifier 11 and the Schmitt trigger 12 together consititute an adjustable threshold circuit which will provide an output from the Schmitt trigger when the input signal A exceeds a selected threshold level, the particular threshold level desired being selected by adjusting the gain of the amplifier 11. In the present case it will be assumed that the threshold circuit is set to detect when the input signal exceeds a threshold level of 0.25 volts, corresponding to the horizontal dashed line superimposed on the signal A in FIG. 2, and the gain of the amplifier 11 is therefore adjusted at such a value that an input signal of just 0.25 volts would be amplified to the fixed threshold level of the Schmitt trigger 12.

The output from the Schmitt trigger is shown at B in FIG. 2 for the 0.25 volt threshold level assumed above and which intercepts all of the input signal components shown. The signal B is a binary pulse-form signal in which the component pulses TX, EF, E1 and E2 (derived from the similarly referenced signal components of the analog signal A) are all at 12 volt logic '1' level. In order to provide reliable operation of the Schmitt trigger for input signals just at the threshold level, and to provide that the output pulses from such signals have a reasonable width, the operational amplifier circuit 11 may itself be designed to perform a degree of preliminary pulse-shaping in addition to amplification.

The output signal B from the Schmitt trigger 12 is now processed by digital logic circuitry to suppress all but the required second echo pulse E2. The first pulse to be suppressed is the transmission pulse TX and for this purpose the signal B is fed to an inverter 13 to provide an inverted signal C, FIG. 2, which in turn is applied to one input of a first NOR-gate 14. The other input to the NOR-gate 14 is derived from an input 15 to which is applied a transmission pulse $TX_e$ which is available as a standard logic output on most modern echosounders. The pulse $TX_e$ is generally supplied at logic '0' level by the echosounder, as shown at D in FIG. 2, and is therefore inverted in an inverter 16. The inverted $TX_e$ pulse is next "stretched" to about 12 msecs duration by a monostable multivibrator 17 to provide the stretched transmission pulse $TX_e'$ shown at E, FIG. 2, and the latter is supplied to the second input of the NOR-gate 14. The resultant output signal from the NOR-gate 14 is shown at F, from which it is seen that the transmission pulse TX in the signal B has been removed.

The stretching of the input transmission pulse $TX_e$ is necessary for several reasons. Firstly, the standard transmission pulse supplied by the echosounder is generally only a few msecs long, shorter than the pulse TX in the signal B, and therefore complete suppression of the pulse TX would not be achieved in the NOR-gate 14 if the unstretched pulse were used. Secondly, the stretched pulse $TX_e'$ avoids any breakthrough of aeration echoes which may sometimes extend deep into the water underneath the keel.

The next function to be performed is to suppress any unwanted echoes above the seabed, such as the fish echo pulse EF, and for this purpose it is necessary initially to isolate the first bottom echo pulse E1. This is achieved as follows.

The signal A from input 10 is supplied to a second adjustable threshold circuit comprising the combination of a variable gain operational amplifier circuit 20 and a Schmitt trigger 21 which operate in a similar manner to the components 11 and 12 previously described. However, in this case the gain of the variable amplifier 20 (controlled as before by a multiturn potentiometer) is adjusted to a lower value than that set by the amplifier 11, thereby setting a higher effective threshold level for the input signal A than that set by the first threshold circuit 11/12. This is essential, since only the first bottom echo pulse E1 is required from the Schmitt trigger 21, accompanied of course by the unwanted transmission pulse TX. The output signal H from the Schmitt trigger 21 is inverted in an inverter 22 and applied to one input of a second NOR-gate 23. The other input of the NOR-gate 23 is supplied with the stretched transmission pulse $TX_e'$, and this effects a suppression of the TX pulse in the signal H in the same way that the NOR-gate 14 suppressed the TX pulse in the signal B. The output from the NOR-gate 23 is therefore the signal I, consisting of only the first bottom echo pulse E1.

The leading edges of the pulses $TX_e'$ and E1 shown at E and I in FIG. 2 now respectively set and reset a bistable multivibrator or latch 24 to provide an output from the latter shown at J in FIG. 2, although the setting of the latch could alternatively be performed by the unstretched $TX_e$ pulse from the inverter 16 if desired. The signal J is supplied to one input of a third NOR-gate 19. The other input to the NOR-gate is the signal G, FIG. 2, derived by inversion of the signal F in an inverter 18. In the NOR-gate 19 the signal J suppresses all pulses from the seabed upwards in the signal F, such as the fish echo EF, resulting in the output signal K comprising the first and second bottom echo pulses E1 and E2 respectively.

It is now necessary to suppress the first bottom echo pulse E1 in the signal K, and this is achieved in a fourth NOR-gate 27. One input to the NOR-gate 27 is the signal K inverted in an inverter 26, and the other input is a signal L which is a stretched version E1' of the first bottom echo pulse E1 derived by feeding the signal I to a second monostable multivibrator 25. In the NOR-gate 27 the stretched pulse E1' (having a duration of about 30 msecs) suppresses the first bottom echo pulse E1 in the signal K plus some extra up to a total of about 12 fathoms. The duration of the stretched pulse E1' is important; if it is too short sidelobe echoes from the first bottom echo may interfere with the successful performance of the circuit, and if it is too long the minimum depth of operation would be restricted since otherwise the desired second bottom echo pulse E2 would also be suppressed.

It is to be noted that the change of state from logic '1' to logic '0' at the trailing edge of the signal J derived from the latch 24 is slightly delayed relative to the leading edge of the pulse E1 (signal I) which triggers this change. This is deliberate, and provides a similarly delayed leading edge to the pulse E1 in signal K which gives a small margin of safety of several microseconds in the signal timing at the inputs to the NOR-gate 27. In other words, this small delay ensures that the leading edge of the stretched pulse E1' reaches the NOR-gate 27 no later than the leading edge of the pulse E1 in signal K, thereby ensuring complete suppression of pulse E1 despite any inadvertent delays in the circuit. Similar small delays may be introduced elsewhere in the circuit if necessary to ensure that signals arrive at the NOR-gates with correct timing. The output signal M from the NOR-gate 27 is therefore the required single second bottom echo pulse E2.

From the foregoing it will be seen that by using a series of NOR-gates the digital processing circuitry successively removes from the original digital signal B the pulse TX, all pulses such as EF down to the seabed, and finally the pulse E1 and beyond, to leave the single pulse E2 provided that the amplitude of the second bottom echo component in the original analog signal A was greater than the threshold set by the gain control of the amplifier 11.

The remaining second bottom echo pulse E2 is now stretched in a third monostable multivibrator 28 to provide a stretched pulse E2' (signal N) of sufficient duration to trigger an alarm generator 29. In the present case the alarm generator 29 is arranged to provide a single two-tone audio signal to a loudspeaker 30 in response to each stretched pulse E2', but the alarm may alternatively or additionally be visual. Furthermore, it may not be desirable to raise the alarm in respect of a single isolated pulse E2, since this might arise from noise or other random circuit fluctuations. If so, the alarm generator 29 can be adapted to provide an audio alarm signal only when a pulse is present during at least two consecutive periods of the echosounder signal, the alarm being triggered by the second and successive pulses.

In deep water, when the amplitude of the signal E2 may be very small, it may be advantageous to be able to trigger the alarm on the first bottom echo signal E1. This is readily achieved by providing means for selectively inverting the signal L prior to application to the NOR-gate 27.

In operation, the vessel's skipper should first of all set up his echosounder for normal fishing operations in "soft" fishing grounds. Both gain controls (amplifiers 11 and 20) of the circuit are then turned down to minimum sensitivity. The first bottom echo sensitivity (amplifier 20) is then slowly increased until an LED (not shown) responsive to the signal I just begins to flash. The master gain control (amplifier 11) is now turned up slowly until the alarm just begins to sound. At this point the latter control is turned back until the alarm just stops. The circuit is now set. The degree of sensitivity depends upon how far back the master gain control is turned from the alarm threshold. From experiments it would appear that the maximum sensitivity actually exceeds normal requirements.

Furthermore, by taking a note of calibrated readings on the multi-turn controls and comparing them with reference readings it is possible for the fisherman to find new grounds which would be safe to fish with a reasonable degree of certainty.

While the above-described block circuit shows the main discriminatory and logical operations to be performed at each stage of the processing, it is to be understood that certain refinements may be necessary according to conventional logic design in order to provide a practical and efficient implementation. For example, additional Schmitt triggers may be used in known manner where necessary to "clean-up the pulses and restore the logic levels where tnese may have deteriorated during the processing, and as mentioned above small delays may need to be introduced to ensure correct signal timing at the logic gates. However, these and other details are well within the capabilities of the skilled logic designer, given the nature of the input signal and the result to be obtained.

In the above embodiment the waveforms J and L are used to suppress all except the second bottom echo component E2 in the pulse-form echosounder signal B. However, these could instead be used to isolate the second bottom echo component in the original analog signal A, so that the signal E2 is isolated at its at its original amplitude. This would enable the second echo component to drive a meter for continuous monitoring of its value. The alarm may in this case be raised by thresholding the isolated analog second echo component, in the simplest case by providing a distinct mark, for example a red sector, on the meter at the selected threshold value.

I claim:

1. A circuit for use in association with an echosounder developing an echosounder signal for the automatic discrimination of the nature of the seabed over which a vessel is passing, the circuit comprising:
   input means for receiving the echosounder signal from the echosounder, the echosounder signal including,
   a transmission component,
   a first bottom echo component, and
   a second bottom echo component,
   wherein said echosounder signal may also include one or more fish echo components between the transmission and first bottom echo components;
   an adjustable threshold circuit connected to said input means and providing an output when the said echosounder signal in said input means exceeds a selected threshold level;
   signal processing means for removing from said output signal of said threshold circuit those components of said output signal derived from said transmission component, said first bottom echo component and any of said fish echo components in the echosounder signal, said signal processing means developing a processed output signal from said second bottom echo component in the echosounder signal; and
   means for raising an alarm in response to the presence of a second bottom echo component in the processed output signal of said threshold circuit.

2. The circuit as claimed in claim 1, wherein said output from said threshold circuit is a binary pulse-form signal and the signal processing means comprises digital logic circuitry.

3. The circuit as claimed in claim 2, wherein the signal processing means comprises:
   a second adjustable threshold circuit connected to said input means and providing a second pulse-form signal comprising only a transmission component and a first bottom echo component;
   means for stretching a transmission pulse generated independently by the echosounder;
   means for using the stretched transmission pulse to remove the transmission component in both the first and second pulse-form signals, thereby isolating the first bottom echo component in the second pulse-form signal;
   means responsive to the leading edge of the independently generated transmission pulse and the leading edge of the isolated first bottom echo component pulse-form signal for removing all components in the first pulse-form signal substantially up to the leading edge of the first bottom echo component;

means for stretching the isolated first bottom echo component, and means for using the stretched pulse to remove all remaining components in the first pulse-form signal except said second bottom echo component.

4. A circuit for use in association with a hydroacoustic echo signal receiver developing an echo signal, for providing data relating to the nature of the seabed, the circuit comprising:

input means for receiving the echo signal from the hydroacoustic echo signal receiver, the echo signal including first and second bottom echo components;

processing means, responsive to said input means, for processing the received echo signal to obtain a processed signal representing a portion of said echo signal, said portion comprising said second bottom echo component; and means, responsive to said processing means, for utilizing said processed signal to provide an indication of a predetermined characteristic of said second bottom echo component, said predetermined characteristic warning of a change in the nature of the seabed, said utilizing means defining said characteristic as a function of said second bottom echo component exceeding a selected threshold.

5. The circuit as claimed in claim 4, wherein said processing means comprises threshold means for detecting when said second bottom component exceeds said selected threshold and said processed signal being a binary signal representing moments at which said second bottom echo component exceeds said selected threshold.

6. The circuit as claimed in claim 5, further comprising alarm means, responsive to said processed signal, for providing an alarm that is dependent upon said moments at which said second bottom echo component exceeds said selected threshold.

7. The circuit as claimed in claim 6, wherein said alarm means is responsive to two successive second bottom echo components exceeding said threshold.

8. The circuit as claimed in claim 4, wherein the processed signal is an analog representation of said second bottom echo.

9. The circuit as claimed in claim 8, wherein there are means for displaying said processed signal to provide a visual indication when the processed signal exceeds the selected threshold.

10. The circuit according to claim 8, further comprising trigger means for triggering an alarm when said processed signal exceeds a predetermined threshold.

11. The circuit as claimed in claim 4, wherein said echo signal also includes a transmission component that corresponds to the transmission pulse of the echo signal receiver, and wherein said processing means comprises deletion means for removing from said received echo signal said transmission component, said first bottom echo signal and any component therebetween.

12. The circuit as claimed in claim 11, wherein said deletion means comprises, first means for masking said transmission component and any components between the transmission and said first bottom echo components, and second means for masking said first bottom echo component.

13. A circuit as claimed in claim 12, wherein said deletion means comprises:

an adjustable threshold circuit means for processing said received signal to produce a waveform that comprises only said transmission component and said first bottom echo component;

receiver means for receiving said transmission pulse defining the moment of emission of a transmitted hydroacoustic signal;

means for stretching the transmission pulse;

means for removing said transmission component from said waveform leaving first bottom echo pulse using the stretched transmission pulse;

means, responsive to the leading edge of the transmission pulse and the leading edge of said first bottom echo pulse, for defining a first masking signal for masking all components upto said first bottom echo component; and means for stretching said first bottom echo pulse to define a second masking signal for masking said first, bottom echo signal without masking said second bottom echo signal.

* * * * *